(12) United States Patent
Ashbrook et al.

(10) Patent No.: US 10,933,335 B1
(45) Date of Patent: Mar. 2, 2021

(54) METHODS AND SYSTEMS OF HYBRID ACTUATOR-SYSTEM CONTROL (71) Applicant: Disney Enterprises, Inc., Burbank, CA (US)

(72) Inventors: Jeffrey R. Ashbrook, Burbank, CA (US); Robert E. Huebner, Burbank, CA (US); Asa K. Kalama, Burbank, CA (US); Daniel Sass, Burbank, CA (US); Michael Arevalo, Burbank, CA (US)

(73) Assignee: DISNEY ENTERPRISES, INC., Burbank, CA (US)

(*) Notice: Subject to any disclaimer, the term of this patent is extended or adjusted under 35 U.S.C. 154(b) by 143 days.

(21) Appl. No.: 16/200,293

(22) Filed: Nov. 26, 2018

Related U.S. Application Data

(60) Provisional application No. 62/610,880, filed on Dec. 27, 2017.

(51) Int. Cl.
| | |
|---|---|
| *A63G 31/06* | (2006.01) |
| *A63F 13/803* | (2014.01) |
| *A63F 13/21* | (2014.01) |
| *G09B 9/14* | (2006.01) |
| *B60K 26/00* | (2006.01) |

(52) U.S. Cl.
CPC ............ *A63F 13/803* (2014.09); *A63F 13/21* (2014.09); *B60K 26/00* (2013.01)

(58) Field of Classification Search
CPC .......... A63G 7/00; A63G 31/00; A63G 31/16; G09B 9/00; G09B 9/14

USPC .................... 472/43, 59–61, 130; 434/29, 55
See application file for complete search history.

(56) References Cited

U.S. PATENT DOCUMENTS

| | | | | |
|---|---|---|---|---|
| 6,179,619 B1* | 1/2001 | Tanaka | ...................... | A63G 7/00 434/307 R |
| 8,858,351 B2* | 10/2014 | Crawford | .................. | A63G 7/00 463/30 |
| 2010/0279255 A1* | 11/2010 | Williams, II | ............ | G09B 9/14 434/29 |
| 2014/0302462 A1* | 10/2014 | Vatcher | ................... | A63G 31/16 434/55 |
| 2016/0089610 A1* | 3/2016 | Boyle | ...................... | A63F 13/65 463/7 |

* cited by examiner

*Primary Examiner* — Kien T Nguyen
(74) *Attorney, Agent, or Firm* — Kilpatrick Townsend & Stockton LLP (57) ABSTRACT

Systems and methods for hybrid actuator system control are disclosed herein. The system can include a simulation vehicle. The simulation vehicle can transit at least one passenger through a ride experience, can include a plurality of controls, and can be mounted on an actuator system controllable to move the simulation vehicle in connection with at least one ride event. The system can include a processor. The processor can: provide content to the at least one passenger; receive user inputs via the plurality of controls of the simulation vehicle; identify authored control data; generate algorithmic control data; generate a hybrid control signal according to a combination of the authored control data and the algorithmic control data; and control movement of the simulation vehicle according to the hybrid control signal.

33 Claims, 8 Drawing Sheets

METHODS AND SYSTEMS OF HYBRID ACTUATOR-SYSTEM CONTROL

CROSS-REFERENCE TO RELATED APPLICATIONS

This application claims the benefit of U.S. Provisional Application No. 62/610,880, filed on Dec. 27, 2017, and entitled "Methods And Systems Of Hybrid Actuator-System Control", the entirety of which is hereby incorporated by reference herein.

BACKGROUND

The present disclosure relates generally to management of a ride experience of an amusement ride. While amusement rides have historically been mechanically based, amusement rides increasingly integrate virtual or gaming-based aspects. The integration of virtual or gaming-based aspects into an amusement ride can improve the passenger experience by enabling passenger control of all or portions of the amusement ride and thus creating a customized ride experience.

The integration of virtual or gaming-based components into an amusement ride can include several drawbacks including, for example, uncertainty arising from potential variations in the experience lengths based on user input, and management of tasks/difficulty to allow passengers of wide ranging skill levels to participate in the ride experience. Due to these drawbacks, further developments in amusement rides are desired.

BRIEF SUMMARY

One aspects of the present disclosure relates to a system for hybrid actuator system control. The system includes: a simulation vehicle that can transit at least one passenger through a ride experience from a starting position to a terminating position, the simulation vehicle including a plurality of controls and mounted on an actuator system controllable to move the simulation vehicle in connection with at least one ride event; and a processor. The processor can: provide content to the at least one passenger; receive user inputs via the plurality of controls of the simulation vehicle; identify authored control data; generate algorithmic control data; generate a hybrid control signal according to a combination of the authored control data and the algorithmic control data; and control movement of the simulation vehicle according to the hybrid control signal.

In some embodiments, controlling movement of the simulation vehicle according to the hybrid control signal includes sending the hybrid control signals to the actuator system. In some embodiments, the processor can identify game events prior to identifying authored control data and generating algorithmic control data. In some embodiments, the game events include at least one of: a change in direction of travel; an acceleration; a deceleration; or a collision with an object. In some embodiments, the authored control data is identified based on a combination of the user inputs and the identified game events.

In some embodiments, the algorithmic control data is identified based on a combination of the user inputs and the identified game events. In some embodiments, the algorithmic control data is generated according to physics based model. In some embodiments, the authored control data indicates an exaggerated motion as compared to a motion indicated by the algorithmic control data. In some embodiments, the authored control data indicates a diminished motion as compared to a motion indicated by the algorithmic control data.

In some embodiments, generating the hybrid control signal includes retrieving weighting data. In some embodiments, the weighting data characterizes a relative importance of each of the authored control data and the algorithmic control data in generating the hybrid control signal and in combining the authored control data and the algorithmic control data according to the weighting data. In some embodiments, the processor can apply a safety modification to the control signals. In some embodiments, the safety modification changes the control signals according to a safety envelope limiting motions of the actuator system.

One aspect of the present disclosure relates to a method for hybrid actuator system control. The method includes: providing content to at least one passenger of a simulation vehicle that can transit the at least one passenger through a ride experience; receiving user inputs via a plurality of controls of the simulation vehicle; identifying authored control data; generating algorithmic control data; generating a hybrid control signal according to a combination of the authored control data and the algorithmic control data; and controlling movement of the simulation vehicle according to the hybrid control signal.

In some embodiments, controlling movement of the simulation vehicle according to the hybrid control signal includes sending the hybrid control signals to an actuator system that can move the simulation vehicle in connection with at least one ride event forming a part of the ride experience. In some embodiments, the method includes identifying game events prior to identifying authored control data and prior to generating algorithmic control data. In some embodiments, the game events include at least one of: a change in direction of travel; an acceleration; a deceleration; or a collision with an object.

In some embodiments, the authored control data is identified based on a combination of the user inputs and the identified game events. In some embodiments, the algorithmic control data is identified based on a combination of the user inputs and the identified game events. In some embodiments, the algorithmic control data is identified according to physics based model. In some embodiments, the authored control data indicates an exaggerated motion as compared to a motion indicated by the algorithmic control data. In some embodiments, the authored control data indicates an diminished motion as compared to a motion indicated by the algorithmic control data.

In some embodiments, generating the hybrid control signal includes retrieving weighting data. In some embodiments, the weighting data characterizes a relative importance of each of the authored control data and the algorithmic control data in generating the hybrid control signal and in combining the authored control data and the algorithmic control data according to the weighting data. In some embodiments, the method includes applying a safety modification to the control signals, wh. In some embodiments, the safety modification changes the control signals according to a safety envelope limiting motions of the actuator system.

One aspect of the present disclosure relates to a method of applying dynamic movement constraints on a virtual experience. The method includes: providing content to at least one passenger of a simulation vehicle that can transit the at least one passenger through a ride experience; receiving user inputs via a plurality of controls of the simulation vehicle; determining a user skill level based on the received user inputs; determining progress through the virtual experience;

and generating first movement constraints based on a combination of user skill level and progress through the virtual experience.

In some embodiments, the first movement constraints include static constraints. In some embodiments, the first movement constraints include dynamic constraints. In some embodiments, the dynamic constraints vary during the ride experience as the user skill level varies. In some embodiments, the method includes applying the first movement constraints to a portion of the ride experience. In some embodiments, the method includes determining a constraint collision. In some embodiments, the constraint collision includes a indicated movement of a virtual conveyance beyond at least one of the movement constraints.

In some embodiments, the constraint collision is triggered by a received user input. In some embodiments, the method includes modifying motion of the virtual conveyance based on the first movement constraint. In some embodiments, modifying motion of the virtual conveyance includes redirecting the virtual conveyance away from the first movement constraint. In some embodiments, modifying motion of the virtual conveyance includes providing tactile feedback to the passenger via the controls of the modified motion of the virtual conveyance. In some embodiments, the method includes providing the modified motion of the virtual conveyance to the passenger. In some embodiments, the method includes generating a second movement constraint for a second portion of the ride experience. In some embodiments, the second movement constraint is associated with a level of freedom of movement that is less than a level of freedom of movement associated with the first movement constraint.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

I. Introduction

Developing technologies in simulation present many opportunities for future creation of amusement rides that provide a unique and customized experience for ride passengers. This customization and uniqueness can arise through the merging of traditional amusement rides with video gaming and simulation technologies to create hybrid rides that incorporate aspects of both traditional amusement rides and gaming/simulation. While such hybrid rides can create more interactive experiences than previously possible with traditional amusement rides, these hybrid rides present new problems.

In contrast to pure video games, hybrid rides can provide a combined experience including gaming aspects merged with motion or simulated motion. While in some ways similar to the experience provided by a simulator, a pure simulation may provide too much or too little motion based on user inputs or events within the experience. In the case of the providing of too much motion, the experience may cause motion sickness, be less enjoyable, restrict certain groups of people from riding due to safety concerns, or cause injury. However, in the case of providing too little motion, the entertainment value of the experience may be greatly diminished.

Motion within a hybrid ride can be controlled according to a combination of authored motion information and algorithmically generated motion information. In some embodiments, algorithmically generated motion information can be generated according to an algorithm and/or model based in physics and specifically in Newtonian physics. This motion information can be generated according to data representing gravitational forces, accelerations, movements, or the like. In contrast to algorithmically generating motion information, authored motion information is independent of any algorithm or model. Rather, authored motion information can be created by a motion animator to either increase or decrease motion in the amusement ride as compared to the algorithmically generated motion information. In some embodiments, authored motion information can be stored in memory in the form of one or several motion curves or data collections. These motion curves or data collections can be associated with all or portions of the amusement ride. In some embodiments, for example, a motion curve or data collection can be associated with a portion of the ride experience and motion data can be retrieved from this motion curve or data collection during that portion of the ride experience.

Both algorithmically generated motion information and authored motion information can be combined to generate hybrid motion information or to generate one or several hybrid motion controls. In some embodiments, the algorithmically generated motion information and the authored motion information can be combined by a hybrid control generation module according to one or several combination rules. These combination rules can identify when, how, and to what degree the algorithmically generated motion information and the authored motion information are combined. The hybrid control generation module can generate hybrid motion controls according to the one or several combination rules, and these hybrid motion control can then be used to control movement of a simulation vehicle via movement of actuator system connected to the simulation vehicle.

Further, the design of amusement rides involves the balancing of high passenger throughput against ride experience. This issue of throughput is further complicated by inconsistencies in the amount of time taken to complete an amusement ride. These inconsistencies, in traditional rides, can arise from the loading and unloading of passengers, or from interruptions in the ride. These inconsistencies can result in the "bunching" of cars or sleds awaiting passenger loading or unloading, or at choke-points within the ride.

In addition to these sources of inconsistencies in traditional amusement rides, hybrid rides can also have inconsistency arise from different speeds of user inputs and/or different input choices by users. If a user input is a condition for advancement of the hybrid ride, different speeds with which the user provides this input can increase or decrease the amount of time for the simulation vehicle to reach a termination position. Further, if different user inputs result in the presentation of different content, then user inputs can either decrease or increase the duration of content until the end of the content is reached. Thus, in addition to the problems that can arise from inconsistencies in traditional rides, a hybrid ride can have even greater levels of inconsistency due to the greater role of the user in affecting the presented content and thus the duration of the presented content, as well as the greater role of the user.

In some embodiments, some inconsistencies arising from user interaction with the amusement ride can be minimized via application of motion constraints. This motion constraints can be static motion constraints or these motion constraints can be dynamic motion constraints. Dynamic motion constraints can, in contrast to static motion constraints, be determined or set based on a skill level of the passenger of the amusement ride and vary throughout the amusement ride as the passenger's estimated skill level varies. These motion constraints can limit the degree to which a passenger can control the amusement ride to deviate from one or several predetermined paths, or events, while still allowing the passenger to meaningfully control aspects of the amusement ride. In some embodiments, and regardless of the level of constraints applied to motion of a virtual conveyance for the passenger, the virtual conveyance can be transported towards completion of the ride experience and/or towards completion of a portion of the ride experience at at least a minimum speed. Thus, in some embodiments, the maximum duration of the ride experience is independent of user skill level and/or user inputs.

II. Simulation System

Figure 1:
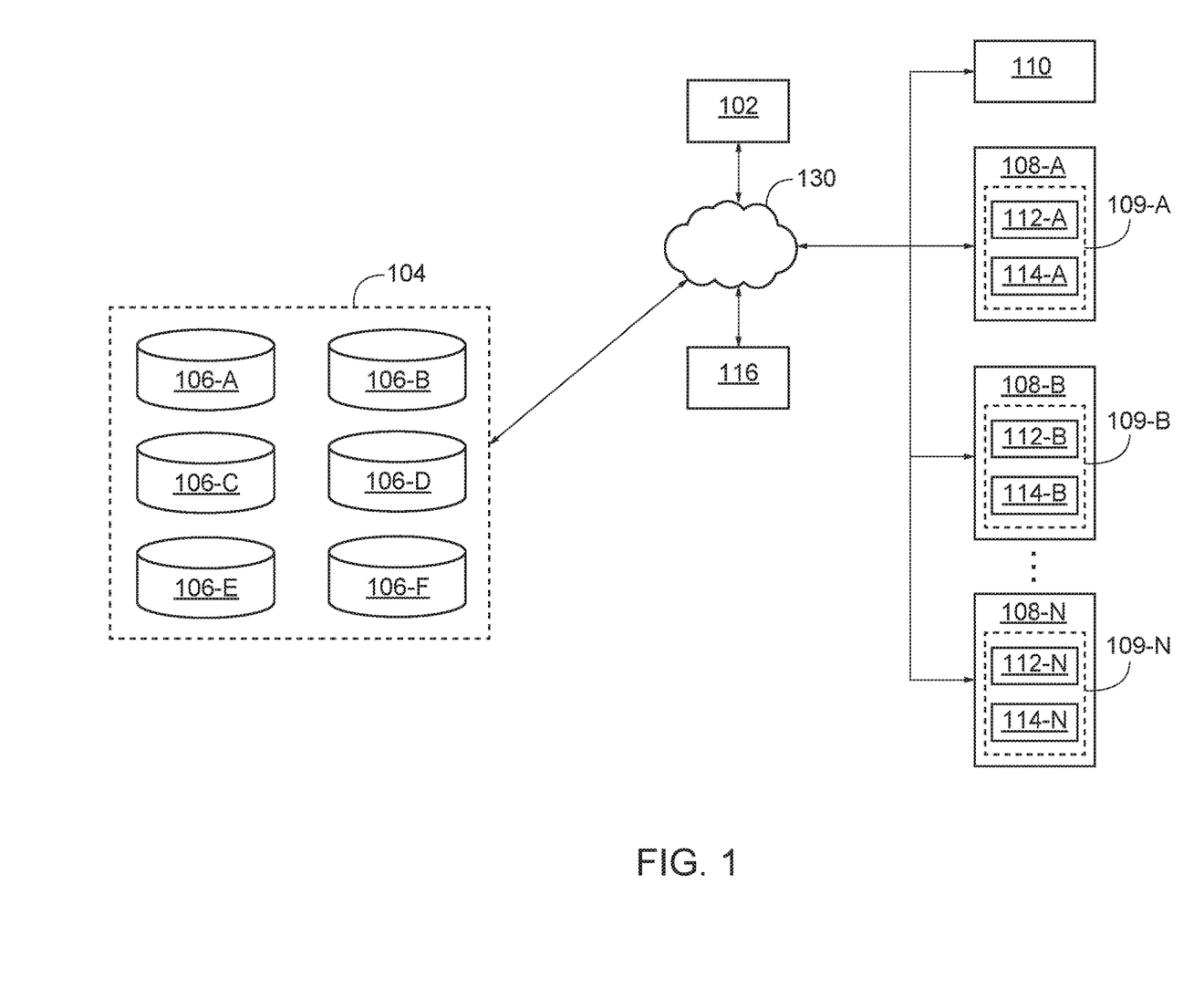
FIG. 1 is a schematic illustration of one embodiment of a system for dynamic unlock.

With reference now to FIG. 1 a schematic illustration of one embodiment of an amusement system 100 is shown. The system 100 can include a processor 102. The processor 102 can be any computing and/or processing device including, for example, one or several laptops, personal computers, tablets, smartphones, servers, mainframe computers, processors, or the like. The processor 102 can be configured to receive inputs from one or several other components of the system 100, to process the inputs according to one or several stored instructions, and to provide outputs to control the operation of one or several of the other components of the system 100.

In some embodiments, the processor 100 can include a game engine that can include a rendering engine. The game engine and the rendering engine can together, or independently develop and/or progress the narrative of the simulation and/or the generate images corresponding to that narrative. In some embodiments, the rendering engine can generate one or several events that can be, in part, based upon user inputs provided to the system 100. These events can include, for example, one or several accelerations, decelerations, changes in direction, interaction with one or several objects or characters, or the like.

In some embodiments, the processor 100 can include a motion control. The motion control can control motion of a simulation vehicle 108 via control of a motion base 110 that is connected to the simulation vehicle and/or upon which or on which the simulation vehicle is mounted. The motion control can control motion of the simulation vehicle according to one or several inputs received from the user and/or one or several game events.

The system 100 can include memory 104. The memory 104 can represent one or more storage media and/or memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data. The memory 104 can be an integral part of the processor 102 and/or can be separate from the processor 102. In embodiments in which the memory 104 is separate from the processor 102, the memory 104 and the processor 102 can be communicatingly linked via, for example, communications network 130. In some embodiments, the communications network 130 can comprise any wired or wireless communication connection between the components of the simulation system 100.

The memory 104 can include software code and/or instructions for directing the operation of the processor 102 and/or can include one or several databases 106 containing information used by the processor 102 and/or generated by the processor 102.

The memory 104 can include a narrative/imagery database 106-A. The narrative/imagery database 106-A stores narrative and image data. This narrative and image data can include information and/or data relating to the narrative and the imagery generated as part of the narrative. Specifically, the narrative and image data is data and information that is used to generate the narrative and the imagery and/or sound in the narrative. This can include identification of one or several: objects; characters; effects; or things existing within the narrative, and data or databases defining these one or several: objects; characters; effects; or things. This data or databases defining the one or several: objects; characters; effects; or things can identify attributes of the one or several objects, characters, effects, or things, which attributes can define a size, a speed, sound, movement characteristics, illumination characteristics, or the like. The narrative database 106-A can further include information regarding events in the narrative and the sequencing of those events.

The memory 104 can include a sled database 106-B. The sled and/or actuator system database 106-B can include data relating to the simulation vehicle and/or the actuator system. In some embodiments, this database 106-B can include information relating to features of the simulation vehicle and/or relating to the control of the simulation vehicle and/or the interaction with user control features located on the simulation vehicle. In some embodiments, for example, the simulation vehicle can move in response to user inputs to the user control features and/or according to the narrative of the simulation or to events in the narrative of the simulation. The sled database 106-B can include data identifying one or several features of the simulation vehicle that enable the movement of the simulation vehicle. These features can include, for example, one or several motors, servo motors, pneumatic, electric, or hydraulic components, any motion causing component, or the like.

The memory 104 can include a motion database 106-C. The motion database 106-C can include information for use in generating control signals to control motion of the simulation vehicle via control of the actuator system. This can include one or several sub-databases of the motion database 106-C. In some embodiments, for example, the motion database 106-C can include a authored sub-database, an algorithmic sub-database, and a hybridization sub-database. The motion database 106-C can include a model sub-database. The model sub-database can include information and/or a model from which algorithmically generated motion information can be generated. This model can be based in physics and specifically in simplified Newtonian physics. With this model, motion information can be generated according to data representing gravitational forces, accelerations, movements, or the like.

The motion database 106-C can include an authored sub-database. The authored sub-database can include information from which authored motion information can be generated and/or determined. The information in the authored sub-database can be created by a motion animator and can either increase or decrease motion in the amusement ride as compared to the algorithmically generated motion information. In some embodiments, the authored sub-database can comprise one or several motion curves or data collections. These motion curves or data collections can be associated with all or portions of the amusement ride. In some embodiments, for example, a motion curve or data collection can be associated with a portion of the ride experience and motion data can be retrieved from this motion curve or data collection during that portion of the ride experience.

The motion database 106-C can include a hybridization sub-database. The hybridization sub-database can include instructions for generation of hybrid control data and/or of one or several hybrid control signals. These instructions can include, for example, one or several rules for the combination of the algorithmic control data and authored control data to generated hybrid control data and/or of one or several hybrid control signals. In some embodiments, these rules can identify, for example, how, when, and to what degree algorithmic control data and authored control data are combined. In some embodiments, for example, the hybrid control data and/or of one or several hybrid control signals can be generated solely from algorithmic control data, solely from authored control data, or from both algorithmic control data and authored control data. In such embodiments, the degree to which one or both of the algorithmic control data and the authored control data impact the hybrid control data and/or of one or several hybrid control signals can be specified based on the combination rules.

The memory 104 can include a skill database 106-D. The skill database can include information identifying a skill level of one or several passengers of the amusement ride. This skill level can be stored independent of a unique passenger identifier such that the skill level is not uniquely identifiable. In some embodiments, this skill level may be associated with a simulation vehicle and/or with a position within the simulation vehicle. In some embodiments, the skill database 106-D can further include information relating to the determination of a skill level of the passenger, and specifically information from which the skill level of the passenger can be determined. In some embodiments, this information can include computer code that when executed can determine a passenger skill level and/or information relating to a passenger, simulation vehicle, and/or position on the simulation vehicle for input into an algorithm for determining a passenger skill level.

The memory 104 can include a safety database 106-E. The safety database 106-E can include information for applying limits to motion control signals such as one or several hybrid motion control signals to maintain the motion of the simulation vehicle within a desired envelope which can be a safety envelope. In some embodiments, the safety database 106-E can identify limits for control signals causing accelerations and/or decelerations of the simulation vehicle.

The memory 104 can include a constraint database 106-F. The constraint database 106-F can include information identifying limitations on movement and/or information for determining limitations on movement. In some embodiments, this can include, for example, the characterization of types of interactions allowed with one or several object such as, for example, defining one or several objects as being able to collide with a virtual conveyance of the passenger and/or defining one or several objects as being unable to collide with the virtual conveyance of the passenger such as by allowing the virtual conveyance to pass through these one or several non-collidable objects. In some embodiments, the constraint database can further include information identifying portions of the game experience and levels of limitations on movement within those portions, which levels can be based on a determined passenger skill level. In some embodiments, for example, a portion of the game experience can be provided with a first level of movement, corresponding to a highest degree of freedom of movement, when the passenger has a high skill level, a second level of movement, corresponding to an intermediate degree of freedom of movement, when the passenger has an intermediate skill level, and a third level of movement, corresponding to a lowest degree of freedom of movement, when the passenger has a low skill level.

The system 100 can include one or several simulation vehicles 108 including, for example, a first simulation vehicle 108-A, a second simulation vehicle 108-B, and up to and including an $N^{th}$ simulation vehicle 108-N. The simulation vehicle 108 can provide hardware corresponding to some or all of the features of the virtual conveyance in which the passenger is located in the gaming/simulation portion of the ride experience. The simulation vehicle 108 can transport passengers from a starting position to a termination position, which starting position can be the location at which passengers enter the simulation vehicle 108 and which termination position can be the location at which the passengers exit the simulation vehicle 108. In some embodiments, the starting position and the termination position can be co-located.

The simulation vehicle 108 can contain one or several passengers in, for example, a seat, a restraint system, or the like. The simulation vehicle 108 and/or the components thereof can be communicatingly connected with the processor 102. This communication connection can allow the providing of information to the simulation vehicle 108, which information can control operation of all or portions of the simulation vehicle 108, and which communicating connection can allow the receipt of information from the simulation vehicle 108 by the server 102, which information can include one or several user inputs at the simulation vehicle 108. The simulation vehicle 108 can be movable according to the narrative and/or according to one or several events in the narrative to, in combination with generated imagery, create the sensation of movement for the passengers. In some embodiments, each of the simulation vehicles 108 can be mounted to, on, and/or upon a motion base 110, also referred to herein as the actuator system. The motion base 110 can move the simulation vehicle 108 that is mounted to, on, and/or upon the motion base 110. The motion base 110 can include one or several: motors; servo motors; pneumatic components; hydraulic components; electric components; any motion causing component; or the like.

The simulation vehicle 108 can include controls 109 that can include a display system 112 and an input system 114. The display system 112 can provide information to the one or several passengers of the simulation vehicle 108 and the input system 114 can receive information from the one or several passengers of the simulation vehicle 108. In some embodiments, each simulation vehicle 108 can include the display system 112 and the input system 114 such that, for example, the first simulation vehicle 108-A can include the first display system 112-A and the first input system 114-A, the second simulation vehicle 108-B can include the second display system 112-B and the second input system 114-B, up to the $N^{th}$ simulation vehicle 108-N which can include the $N^{th}$ display system 112-N and the $N^{th}$ input system 114-N.

The display system 112 can include features to provide information to the users such as, for example, one or several displays, screens, monitors, speakers, or the like, and can include features with which the user can provide input to the simulation vehicle 108. In some embodiments, the input system 114 can include, for example, one or several: wheels; levers; buttons; control sticks; pedals; switches; slides; and knobs. In some embodiments, the simulation vehicle 108 can move and/or be configured to move according to control signals received from the processor 102 and/or the user control features.

The system 100 can include an image generator 116, also referred to herein as a simulation display. The image generator 116 can be communicatingly connected with the processor 102 and can comprise one or several features configured to generate images according to one or several control signals received from the processor 102. The image generator 116 can comprise one or several screens, displays, monitors, projectors, illuminators, lasers, or the like. In some embodiments, the image generator 116 can further include one or several speakers or other features configured to generate sound. In some, the one or several screens, displays, monitors, projectors, illuminators, speakers, and/or lasers forming the image generator 116 can be connected to the simulation vehicle such that they move with the movements of the simulation vehicle 108, or the one or several screens, displays, monitors, projectors, illuminators, and/or lasers forming the image generator 116 can be separated from the simulation vehicle 108. In some embodiments, the one or several screens, displays, monitors, projectors, illuminators, and/or lasers forming the image generator 116 can be wholly or partially: flat; curved; domed; arched; and/or angled. The generated images can be viewable by the passenger from the simulation vehicle 108.

Figure 2:
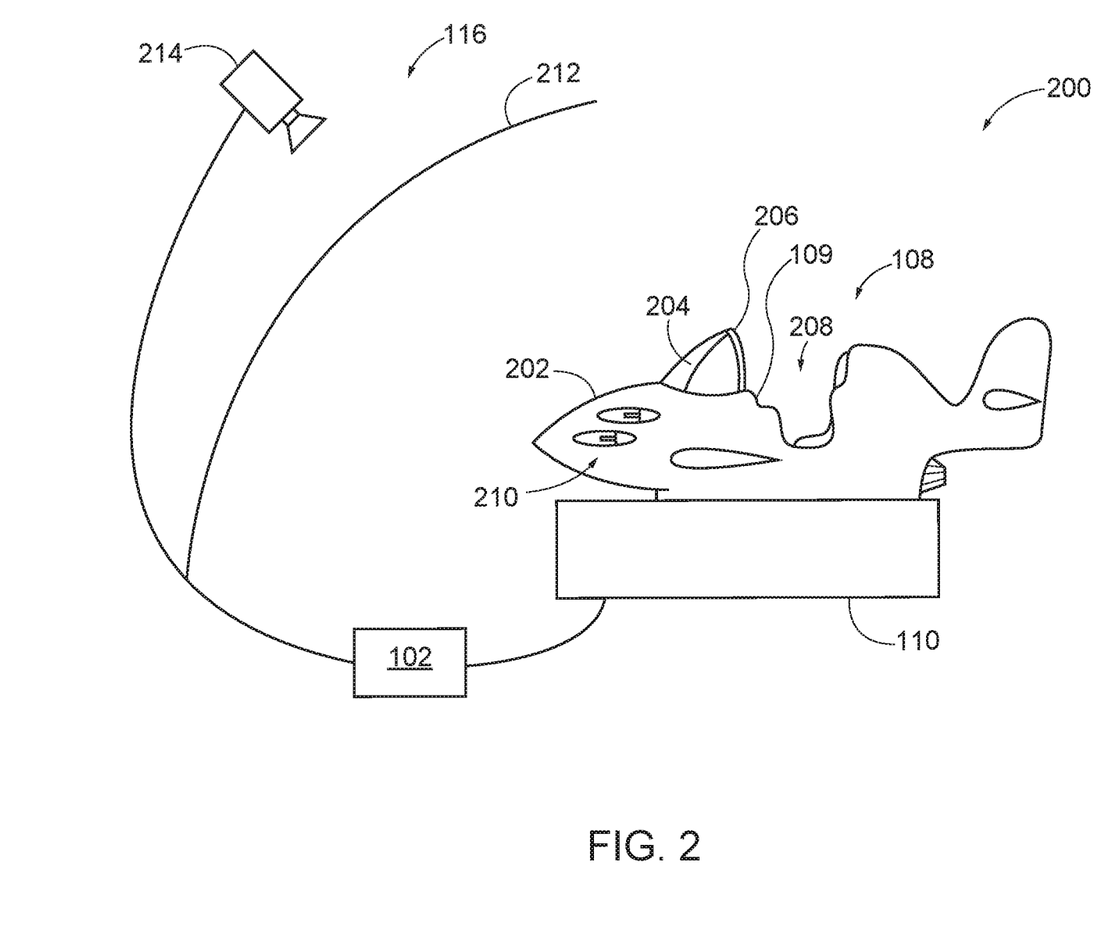
FIG. 2 is a schematic illustration of one embodiment of a system including simulation vehicles.

With reference to FIG. 2, a schematic illustration of a simulation environment 200 is shown. The simulation environment 200 can include all or portions of the system 100. Specifically, as seen in FIG. 2, the simulation environment 200 includes the simulation vehicle 108, the motion base 110, and the user controls 109. The simulation vehicle 108 shown in FIG. 2, further includes a body 202 including windows 204 and opaque structural features 206 such as, for example, a roof, pillars, posts, and/or window frames or framing. The simulation vehicle 108 can further include a passenger area 208 that can include one or several seats, restraints, or the like, and one or several accessory features 210 which can be, for example, one or several simulated weapons such as a simulated firearm, a simulated laser, a simulated missile, a simulated bomb, or the like.

The simulation environment 200 can include the image generator 116. The image generator 116 can include a screen 212 and at least one projector 214. The screen 212 can comprise a variety of shapes and sizes and can be made from a variety of materials. In some embodiments, the screen 212 can be flat, and in some embodiments, the screen 212 can be angled, curved, domed, or the like. In some embodiments, the screen 212 is curved and/or domed to extend around all or portions of the simulation vehicle 108, and specifically is curved and/or domed to extend around portions of the simulation vehicle 108 so that a passenger looking out of the simulation vehicle 108 sees the screen.

One or several projectors 214 can project images onto the screen 212. These projectors 214 can be located on the same side of the screen 212 as the simulation vehicle 108 or on the opposite side of the screen 212 as the simulation vehicle. The projectors 214 can be controlled by the processor 102.

III. Simulation Vehicle

Figure 3:
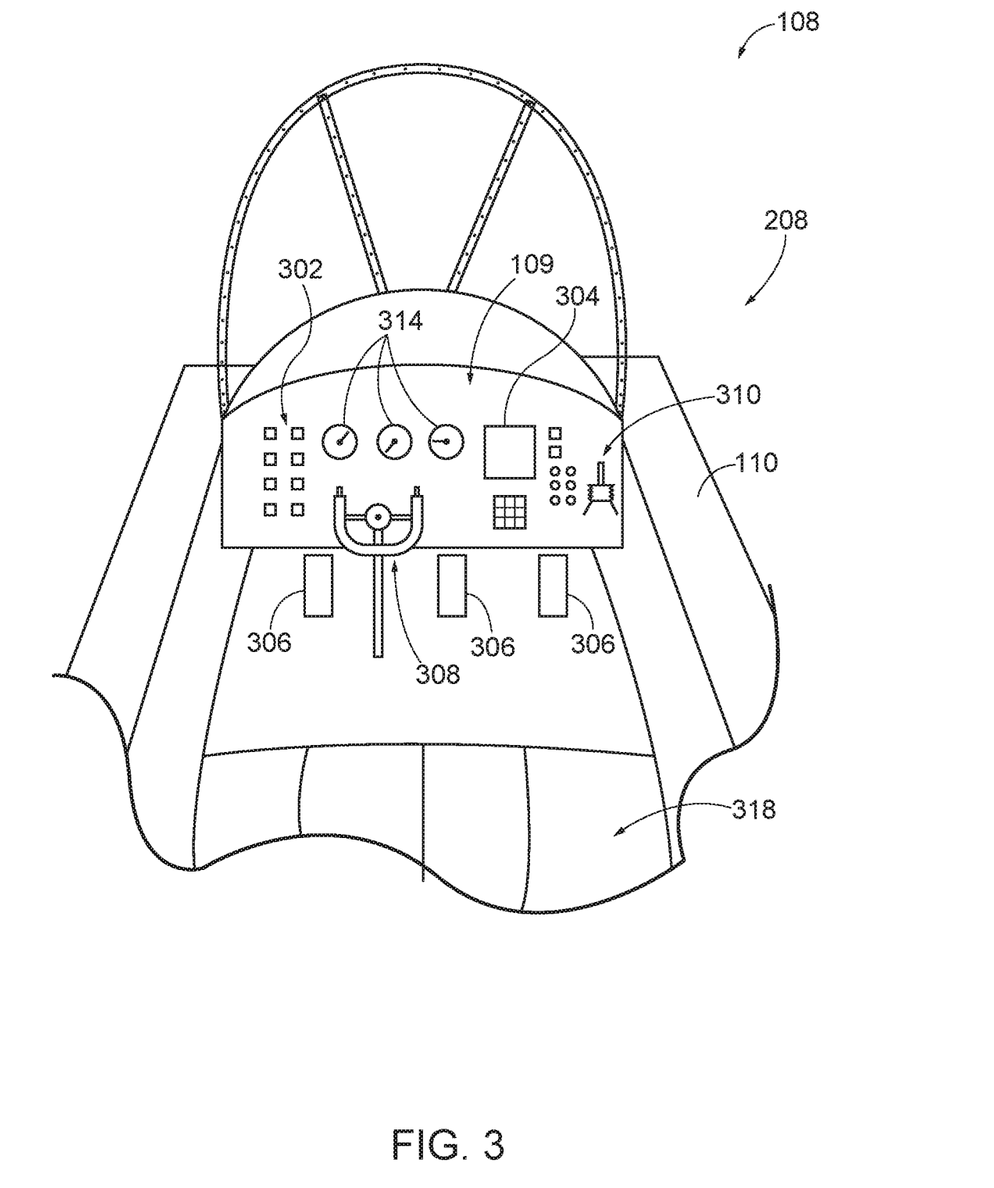
FIG. 3 is an illustration of one embodiment of a passenger area of a simulation vehicle.

With reference now to FIG. 3, an illustration of one embodiment of the passenger area 208 of the simulation vehicle 108 is shown. The simulation vehicle 108 is mounted on the motion base 110 and the simulation vehicle 108 includes controls 109 including the display system features 112 and the input system features 114. The display system features 112 can include, for example, one or several: displays 304, including screens, monitors, touchscreens, or the like; one or several gauges 314, or the like. The input system features 114 can include one or several: buttons 302; pedals 306; steering wheels 308; control sticks 310; or the like. As further seen in FIG. 3, the simulation vehicle 108 can include accommodations 318 which can include a seat, one or several passenger restraints, or the like.

IV. Hybrid Motion Control

Figure 4:
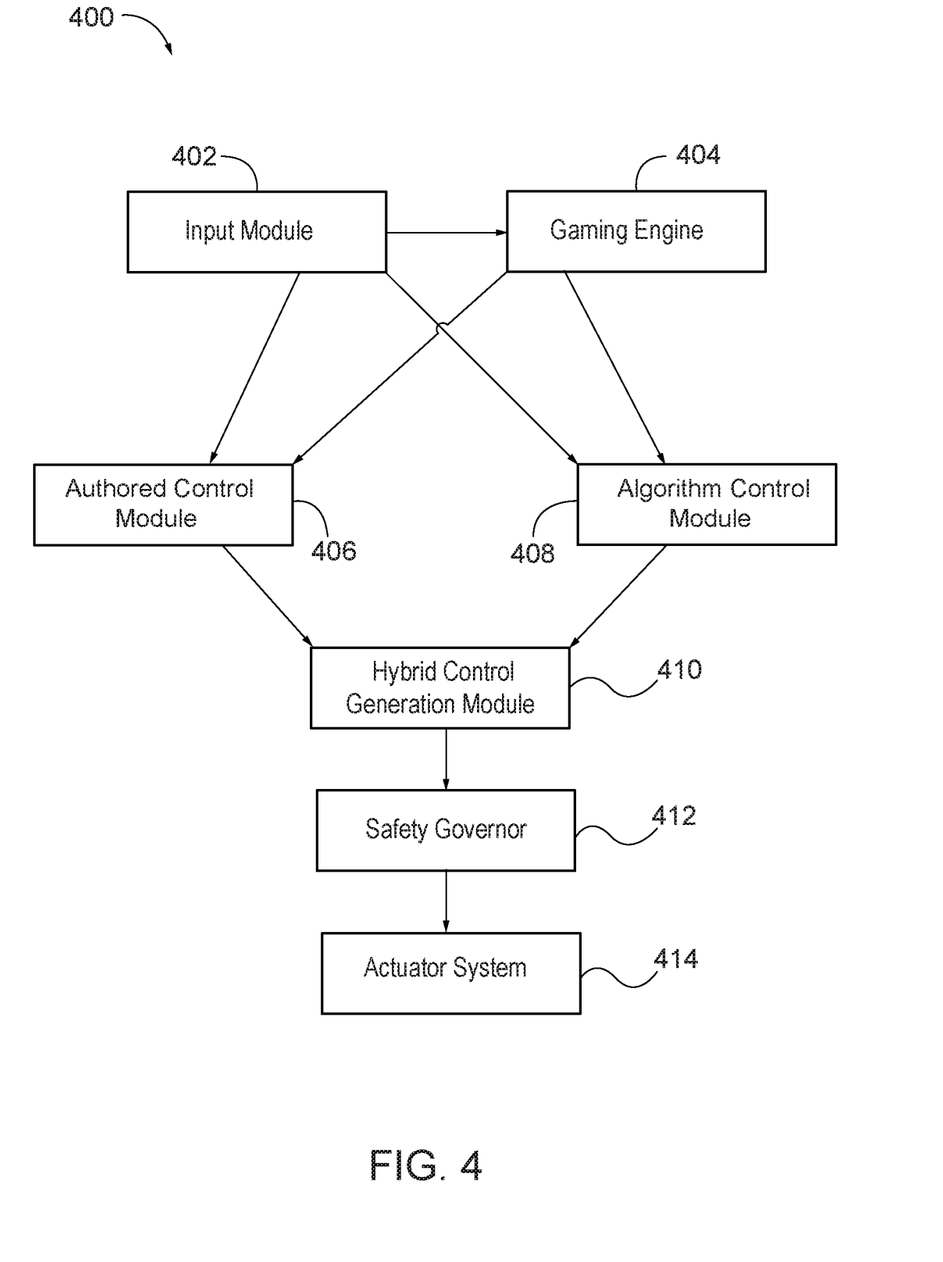
FIG. 4 is a functional block-diagram of modules that can provide for hybrid actuator system control.

With reference now to FIG. 4, a functional block-diagram of modules 400 for providing hybrid actuator system control is shown. These modules 400 can be hardware modules and/or software modules. In some embodiments, these modules can be wholly or partially located on the processor 102. The modules 400 include an input module 402. The input module 402 can communicate with the controls 109 of the simulation vehicle 108 to receive electrical signals corresponding to user inputs provided via the controls. The input module 402 can output information relating to the user inputs to the gaming engine 404, to the authored control module 406, and to the algorithm control module 408.

The gaming engine 404 can control the generation and/or presentation of the narrative of the ride experience to a passenger of the simulation vehicle 108. This can include the identification of game events which can include an acceleration, a deceleration, a change in direction of travel, a collision with an object, an explosion, or the like. The generation and/or presentation of the narrative of the ride experience can include generation of signals to control the image generator 116 to generate imagery and/or sound corresponding to one or several events in the narrative of the ride experience. In some embodiments, based on the received user inputs, the gaming engine can identify a response of the virtual conveyance to the user inputs and/or the direct or indirect effects of the user inputs on the virtual conveyance. In some embodiments, and by way of example, a direct effect includes when a user input indicates a turn of the virtual conveyance, and an indirect effect includes when a user inputs causes the explosion of an object within the gaming/simulation portion of the ride experience, which explosion creates shock-waves buffeting the virtual conveyance. The gaming engine can further track the passenger's and/or simulation vehicle's 108 progression through the ride experience. The gaming engine 404 can output information to the authored control module 406 and to the algorithm control module 408.

The authored control module 406 can identify authored control data for controlling the motion base 110 according to information received from the input module 402 and the gaming engine 404. Specifically, the authored control module 406 can identify authored control data based on a combination of the user inputs and the identified game events. This identification of authored control data can include identification of user inputs, events, and/or progress through the narrative, the querying of the motion database 106-C for motion curves or data collections relevant to the user inputs, events, and/or progress through the narrative, identifying of one or several motion curves or data collections relevant to the user inputs, events, and/or progress through the narrative, and the retrieval of motion data from the one or several motion curves or data collections. In some embodiments, the authored control data can indicate and/or cause generation of a motion that is exaggerated and/or larger than the motion indicated and/or caused to be generated by the algorithmic control data. In some embodiments, the authored control data can indicate and/or cause generation of a motion that is diminished and/or smaller than the motion indicated and/or caused to be generated by the algorithmic control data.

The algorithm control module can generate algorithmic control data. This algorithmic control data can be generated based on a combination of the user inputs and the identified game events. Specifically, the algorithmic control data can be generated according to a model that can be retrieved from the memory 104 and specifically from the model sub-database of the motion database 106-C. This model can be a physics based model, or a pseudo-physics based model. In some embodiments, a pseudo-physics based model can be a model that, in some embodiments, is based on simplified physics.

Each of the authored control module 406 and the algorithm control module 408 can output information to a hybrid control generation module 410. The hybrid control generation module 410 can combine the authored control data and the algorithmic control data to generate a hybrid control signal. The combination of the authored control data and the algorithmic control data can vary according to one or several combination rules that the hybrid control generation module 410 can retrieve from the memory 104 and specifically from the hybridization sub-database of the motion database 106-C. These rules can the relative influence and/or relative weighting of each of the authored control data and the algorithmic control data in forming the hybrid control signal. Thus, in some embodiments, these combination rules may specify applying an equal weight to both the authored control data and the algorithmic control data, and in some embodiments, these combination rules may specify applying an unequal weight to the authored control data and the algorithmic control data. In some embodiments, the hybrid control generation module 410 can generate one or several hybrid control signals by retrieving weighting data and combining the authored control data and the algorithmic control data according to the weighting data.

The hybrid control generation module 410 can output one or several hybrid control signals to a safety governor 412. The safety governor 412 can apply a safety modification to the control signals. In some embodiments, the safety modification changes the control signals according to a safety envelope limiting motions of the actuator system. Thus, in some embodiments, the safety governor 412 can received the one or several hybrid control signals, can retrieve safety envelope information, and can compare the one or several hybrid control signals to the safety envelope. In some embodiments, the safety envelope can be constant, and in some embodiments, the safety envelope can change based on one or several attributes of the passengers. If it is determined that the hybrid control signals do not exceed the safety envelope, then the hybrid control signals are unchanged by the safety governor 412, if it is determined that the hybrid control signals exceed the safety envelope, the hybrid control signals can be modified to remain within the safety envelope.

The safety governor outputs 412 a control signal to the actuator system 414. This control signal is the hybrid control signal generated by the hybrid control generation module 410 and can include a hybrid control signal that is either modified or unmodified by the safety governor. The providing of the one or several control signals to the motion base can control movement of the simulation vehicle 108 according to the hybrid control signal which can be either modified or unmodified. The modules 400 can repeatedly perform the above-outlined steps until the ride experience terminates.

Figure 5:
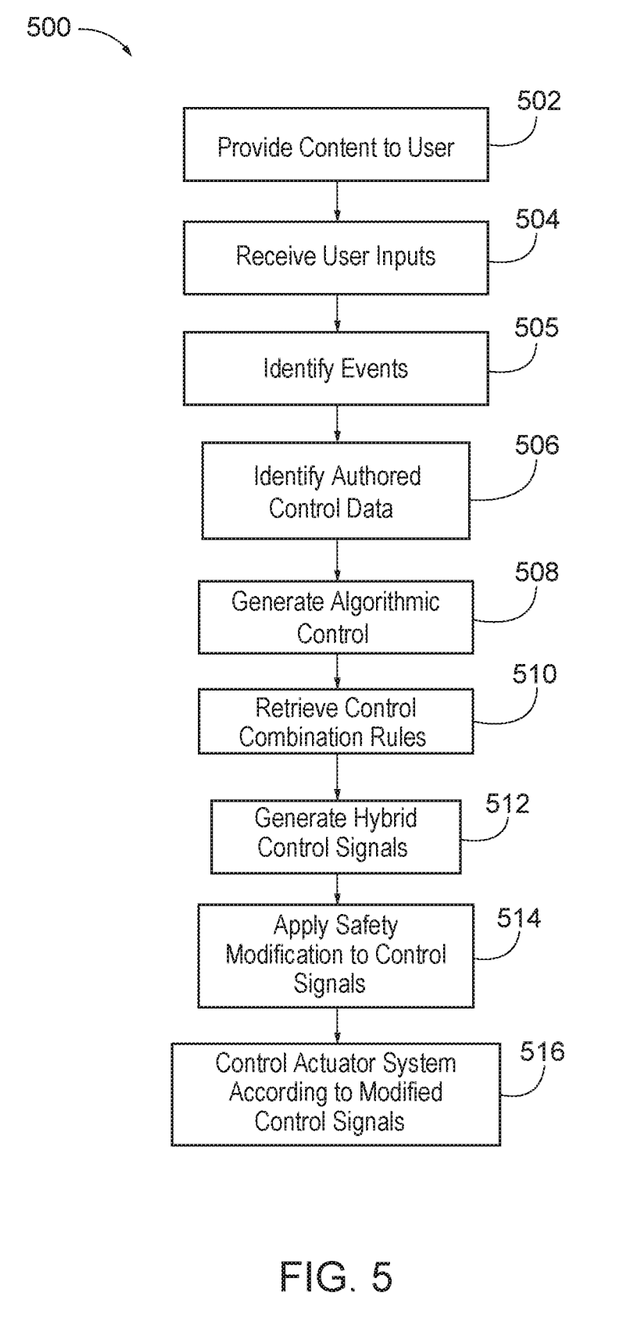
FIG. 5 is a flowchart illustrating one embodiment of a process for hybrid actuator system control.

With reference now to FIG. 5, a flowchart illustrating one embodiment of a process 500 for hybrid actuator system control is shown. The process 500 can be performed by the modules 400 of FIG. 4 and/or by the processor 102. The process 500 begins at bock 502, wherein content is provided to the user. This content that is provided to the user can be identified and/or generated by the gaming engine 404 and can be provided to the user by the display system 112 and/or the image generator 116. At block 504, one or several user inputs are received. The user inputs can be received, initially, by controls 109 of the simulation vehicle 108 and can be provided to the processor 102, and specifically by the input module 402, which can provide outputs to the gaming engine 404, the authored control module 406, and the algorithm control module 408.

At block 505 one or several events in the narrative are identified by the gaming engine. These events can be events resulting from the received user inputs and/or events occurring independent of the received user inputs. At block 506, authored control data is identified based on the received user inputs and/or the identified events. This authored control data can be identified by the authored control module 406 according to information retrieved and/or received from the motion database 106-C. At block 508, algorithmic control data is generated based on the received user inputs and/or the identified events. This algorithmic control data can be generated by the algorithm control module according to information retrieved and/or received from the motion database 106-C.

At block 510, one or several combination rules are received. In some embodiments, for example, the authored control data and the algorithmic control data can be received by the hybrid control generation module 410. The hybrid control generation module 410 can request combination rules for generating one or several hybrid control signals based on the authored control data and the algorithmic control data. The combination rules can be received and/or retrieved from the motion database 106-C.

At block 512, one or several hybrid control signals are generated. These one or several hybrid control signals can be generated by the hybrid generation module 410 according to the combination rules and based on the authored control data and the algorithmic control data. At block 514, any desired safety modification(s) is applied to the one or several hybrid control signals. These safety modifications can be identified and/or applied by the comparison of the one or several hybrid control signals to a safety envelope by the safety governor. The hybrid control signals, either modified or unmodified, can be sent to the motion base 110 to thereby control the motion base 110 according to the hybrid control signals. In some embodiments, the control of the motion base 110 can result in the moving of the simulation vehicle 108.

V. Dynamic Movement Constraints

Figure 6:
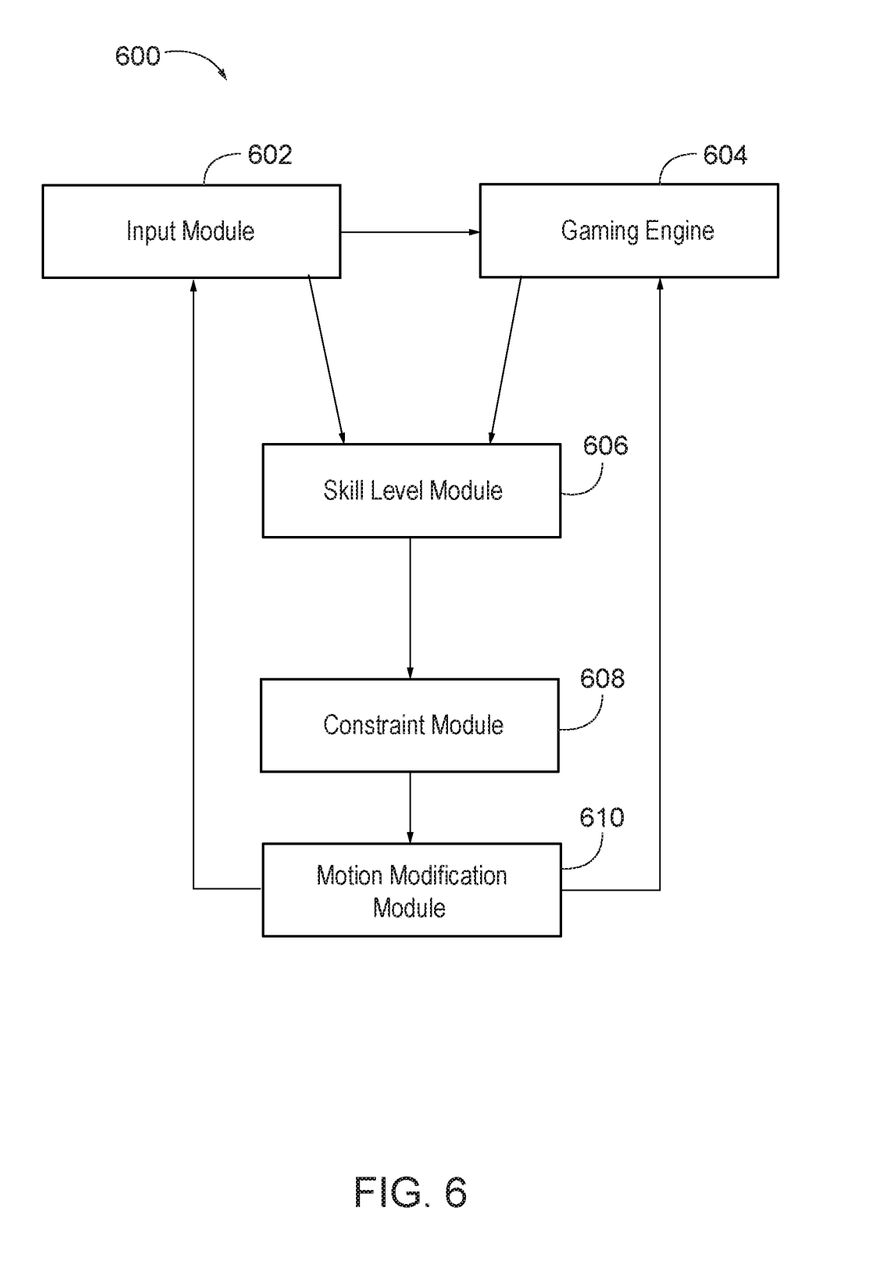
FIG. 6 is a functional block-diagram of a modules that can provide for dynamic movement constraints.

With reference now to FIG. 6, a functional block-diagram of modules 600 for generating and applying dynamic movement constraints are shown. These modules 600 can be hardware modules and/or software modules. In some embodiments, these modules 600 can be wholly or partially located on the processor 102. The modules 600 include an input module 602. The input module 602 can communicate with the controls 109 of the simulation vehicle 108 to receive electrical signals corresponding to user inputs provided via the controls. The input module 602 can output information relating to the user inputs to the gaming engine 604 and to the skill level module 606.

The gaming engine 604 can control the generation and/or presentation of the narrative of the ride experience to a passenger of the simulation vehicle 108. This can include the identification of game events which can include an acceleration, a deceleration, a change in direction of travel, a collision with an object, an explosion, or the like. The generation and/or presentation of the narrative of the ride experience can include generation of signals to control the image generator 116 to generate imagery and/or sound corresponding to one or several events in the narrative of the ride experience. In some embodiments, based on the received user inputs, the gaming engine can identify a response of the virtual conveyance to the user inputs and/or the direct or indirect effects of the user inputs on the virtual conveyance. In some embodiments, and by way of example, a direct effect includes when a user input indicates a turn of the virtual conveyance, and an indirect effect includes when a user inputs causes the explosion of an object within the gaming/simulation portion of the ride experience, which explosion creates shock-waves buffeting the virtual conveyance. The gaming engine can further track the passenger's and/or simulation vehicle's 108 progression through the ride experience. The gaming engine 604 can output information to the skill level module 606.

The skill level module 608 can determine a skill level of one or several passengers of the simulation vehicle 108. The skill level module 608 can determine the skill level of the one or several passengers of the simulation vehicle 108 based on interactions between the passengers and the simulation vehicle 108 and specifically based one user inputs provided to the controls 109 of the simulation vehicle 108. In some embodiments, the skill level can be determined for each passenger of the simulation vehicle 108, the skill level can be determined for each of some of the passengers of the simulation vehicle 108, or a combined skill level can be determined for some or all of the passengers of the simulation vehicle 108. The skill level can be determined by the skill level module 606 based on information received and/or retrieved from the skill database 106-D.

The skill level module can output skill information to a constraint module 608. The constraint module 608 can generate and/or identify one or several motion constraints based on the skill level and information received and/or retrieved from the memory 104 and specifically from the constraint database 106-F. This information received and/or retrieved from the constraint database 106-F can include information identifying limitations on movement and/or information for determining limitations on movement.

In some embodiments, for example, at some or all instants of progression through the ride experience, movement of the virtual conveyance can described by a vector component pointing towards a termination of the ride experience. This vector component can remain constant and/or can identify a minimum speed with which the virtual conveyance moves towards the termination of the ride experience. The motion constraints can identify the degree to which the passenger can control movement of the virtual conveyance away from the vector component pointing towards the termination of the ride experience. In some embodiments, for example, the forward progress of the virtual conveyance may remain constant and/or may be at least at a minimum level, and the motion constraints can identify the degree to which the passenger can control non-forward-progress movement of virtual conveyance. Thus, while a user may control the virtual conveyance to the extent allowed by the motion constraints, in some embodiments, this does not include slowing the forward progress of the virtual conveyance and/or the progress of the virtual conveyance towards the termination of the ride experience.

The motion modification module 610 can receive constraint information from the constraint module 608 and can modify motion according to the constraint information. In some embodiments, this can include modifying the motion of the virtual conveyance and providing game events to the passenger(s) based on this modified motion of the virtual conveyance. In some embodiments, this can include determining a constraint collision. The constraint collision can be an indicated movement of a virtual conveyance beyond at least one of the movement constraints. This can be caused either by an event and/or by a user input. After the constraint collision is determined and/or detected, the movement of the virtual conveyance can be modified. This can include a stopping of the motion or motion component causing the constraint collision and/or the redirecting of the virtual conveyance away from the movement constraint. In some embodiments, the modifying of the motion can further include providing feedback to the passenger such as, for example, tactile feedback to the passenger via one or several of the controls 109, indicative of the constraint collision and/or providing feedback to the passenger such as, for example, tactile feedback, indicative of a nearing constraint collision. The modified motion and/or feedback can be provided to the passenger.

The motion modification can be provided, as shown in FIG. 6, to one or both of the input module 602 and the gaming engine 604. Thus, the module 600 can iteratively determine skill levels and generate and apply motion constraints until the ride experience terminates. In some embodiments, this can include generating a first set of constraints applicable to a first portion of the ride experience and a second set of constraints applicable to a second portion of the ride experience. In some embodiments, these constraints can be different such that the first constraint allows a greater or lesser level of freedom of movement than the second constraint. These different levels of freedom of movement can be based on, for example, a change in the user skill level, a change in a difficulty of the portions of the ride experience, or the like. In some embodiments, for example, the first portion of the ride experience may be easier than the second portion of the ride experience, and thus, the first movement constraint may allow greater freedom of movement than the second movement constraint.

Figure 7:
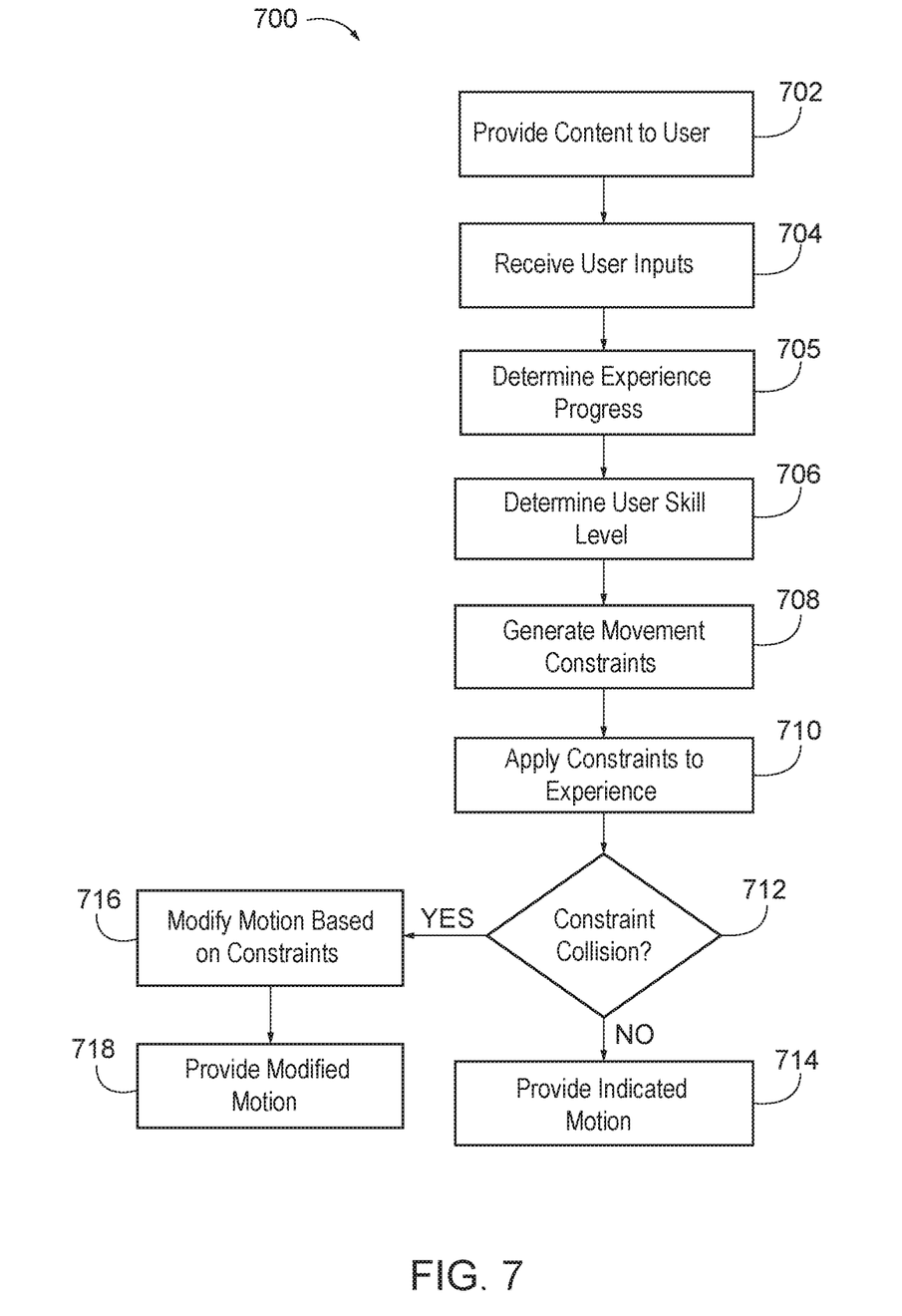
FIG. 7 is a flowchart illustrating one embodiment of a process for dynamic movement constraints.

With reference now to FIG. 7, a flowchart illustrating one embodiment of a process 700 for dynamic movement constraint generation and application is shown. The process 700 can be performed by the modules 600 of FIG. 6 and/or by the processor 102. The process 700 begins at bock 702, wherein content is provided to the user. This content that is provided to the user can be identified and/or generated by the gaming engine 604 and can be provided to the user by the display system 112 and/or the image generator 116. At block 704, one or several user inputs are received. The user inputs can be received, initially, by controls 109 of the simulation vehicle 108 and can be provided to the processor 102, and specifically by the input module 602, which can provide outputs to the gaming engine 604 and the skill level module 606.

At block 705, progress through the ride experience is determined. This can include determining the current portion of the ride experience in which the virtual conveyance is located. The progress through the ride experience can be determined by the gaming engine 604. At block 706, a user skill level is determined. The skill level can be determined by the skill level module 606 based on user interactions with the ride experience and particularly based on user inputs.

At block 708, one or several movement constraints are generated. The one or several movement constraints can be generated by the constraint module according to, in some embodiments, the determined skill level and the progress through the ride experience. The movement constraints can be generated based on information retrieved from the constraint database 106-F. At block 710, the movement constraints can be applied to the ride experience. The movement constraints can be applied to the ride experience by the constraint module 608.

At decision block 712, it is determined whether there is a constraint collision. In some embodiments, this can include determining if the virtual conveyance is moving to or beyond the movement constraint. The motion modification module 610 can determine if there is a constraint collision. If it is determined that there is not a constraint collision, then the process 700 proceeds to block 714, wherein the indicated motion is provided. In some embodiments, this can include the allowing of the virtual conveyance to move as indicated and/or as directed by the received user inputs.

Returning again to decision block 712, if it is determined that there is a constraint collision, then the process 700 proceeds to block 716, wherein the indicated motion is modified according to the motion constraints. This modification can be performed by the motion modification module 610 and can include stopping motion of the virtual conveyance in the direction of the constraint collision and/or redirecting the virtual conveyance away from the direction of the constraint collision. This redirection, in some embodiments, can be in the form of a rotation or rolling along a boundary of allowable motion defined by the motion constraint. At block 718, the modified motion can be provided to the passenger. The modified motion can be provided to the passenger via, for example, the gaming engine 604 and/or the image generator 116. In some embodiments, the providing of the modified motion can further include providing feedback to the passenger such as tactile feedback via the controls 109.

VI. Computer System

Figure 8:
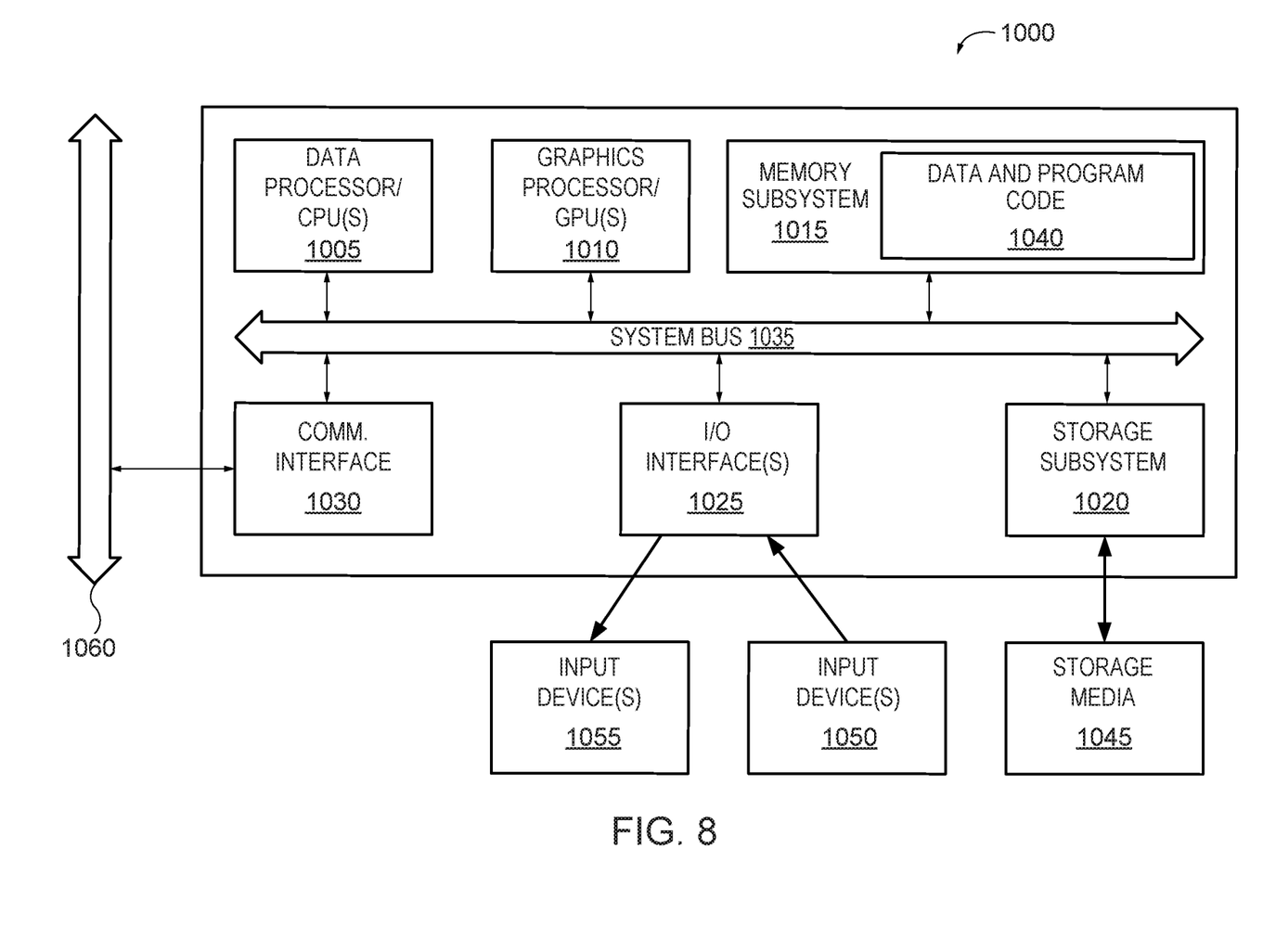
FIG. 8 is a block diagram of a computer system or information processing device that may incorporate an embodiment, be incorporated into an embodiment, or be used to practice any of the innovations, embodiments, and/or examples found within this disclosure.

FIG. 8 shows a block diagram of computer system 1000 that is an exemplary embodiment of the processor 102 and can be used to implement methods and processes disclosed herein. FIG. 8 is merely illustrative. Computer system 1000 may include familiar computer components, such as one or more one or more data processors or central processing units (CPUs) 1005, one or more graphics processors or graphical processing units (GPUs) 1010, memory subsystem 1015, storage subsystem 1020, one or more input/output (I/O) interfaces 1025, communications interface 1030, or the like. Computer system 1000 can include system bus 1035 interconnecting the above components and providing functionality, such connectivity and inter-device communication.

The one or more data processors or central processing units (CPUs) 1005 execute program code to implement the processes described herein. The one or more graphics processor or graphical processing units (GPUs) 1010 execute logic or program code associated with graphics or for providing graphics-specific functionality. Memory subsystem 1015 can store information, e.g., using machine-readable articles, information storage devices, or computer-readable storage media. Storage subsystem 1020 can also store information using machine-readable articles, information storage devices, or computer-readable storage media. Storage subsystem 1020 may store information using storage media 1045 that can be any desired storage media.

The one or more input/output (I/O) interfaces 1025 can perform I/O operations and the one or more output devices 1055 can output information to one or more destinations for computer system 1000. One or more input devices 1050 and/or one or more output devices 1055 may be communicatively coupled to the one or more I/O interfaces 1025. The one or more input devices 1050 can receive information from one or more sources for computer system 1000. The one or more output devices 1055 may allow a user of computer system 1000 to view objects, icons, text, user interface widgets, or other user interface elements.

Communications interface 1030 can perform communications operations, including sending and receiving data. Communications interface 1030 may be coupled to communications network/external bus 1060, such as a computer network, a USB hub, or the like. A computer system can include a plurality of the same components or subsystems, e.g., connected together by communications interface 1030 or by an internal interface.

Computer system 1000 may also include one or more applications (e.g., software components or functions) to be executed by a processor to execute, perform, or otherwise implement techniques disclosed herein. These applications may be embodied as data and program code 1040. Such applications may also be encoded and transmitted using carrier signals adapted for transmission via wired, optical, and/or wireless networks conforming to a variety of protocols, including the Internet.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A system for hybrid actuator system control, the system comprising:
a simulation vehicle configured for at least one passenger in a ride experience, the simulation vehicle comprising a plurality of controls and mounted on motion base controllable to move the simulation vehicle in connection with at least one ride event; and
a processor configured to:
provide content to the at least one passenger;
receive user inputs via the plurality of controls of the simulation vehicle;
identify authored control data within an authored database, the authored control data identified based in part on the received user inputs;
generate algorithmic control data according to a model and based in part on the received user inputs;
generate a hybrid control signal from a weighted combination of the authored control data and the algorithmic control data; and
control movement of the motion base of the simulation vehicle according to the hybrid control signal.

2. The system of claim 1, wherein controlling movement of the simulation vehicle according to the hybrid control signal comprises sending the hybrid control signals to the motion base to control at least one degree of freedom of the motion base.

3. The system of claim 1, wherein the processor is further configured to identify game events prior to identifying authored control data and generating algorithmic control data.

4. The system of claim 3, wherein the game events comprise at least one of: a change in direction of travel; an acceleration; a deceleration; or a collision with an object.

5. The system of claim 3, wherein the authored control data is identified based on a combination of the user inputs and the identified game events.

6. The system of claim 5, wherein the algorithmic control data is identified based on a combination of the user inputs and the identified game events.

7. The system of claim 6, wherein the model comprises a physics based model.

8. The system of claim 7, wherein the authored control data indicates an exaggerated motion as compared to a motion indicated by the algorithmic control data.

9. The system of claim 7, wherein the authored control data indicates an diminished motion as compared to a motion indicated by the algorithmic control data.

10. The system of claim 7, wherein generating the hybrid control signal comprises retrieving weighting data, wherein the weighting data characterizes a relative importance of each of the authored control data and the algorithmic control data in generating the hybrid control signal; and combining the authored control data and the algorithmic control data according to the weighting data.

11. The system of claim 10, wherein the processor is further configured to apply a safety modification to the control signals, wherein the safety modification changes the control signals according to a safety envelope limiting motions of the motion base.

12. A method for hybrid actuator system control, the method comprising:
providing content to at least one passenger of a simulation vehicle configured for at least one passenger;
receiving user inputs via a plurality of controls of the simulation vehicle;
identifying authored control data within an authored database, the authored control data identified based in part on the received user inputs;
generating algorithmic control data according to a model and based in part on the received user inputs;
generating a hybrid control signal from a weighted combination of the authored control data and the algorithmic control data; and
controlling movement of a motion base of the simulation vehicle according to the hybrid control signal.

13. The method of claim 12, wherein controlling movement of the simulation vehicle according to the hybrid control signal comprises sending the hybrid control signals to the motion base configured to move the simulation vehicle in connection with at least one ride event.

14. The method of claim 12, further comprising identifying game events prior to identifying authored control data and prior to generating algorithmic control data.

15. The method of claim 14, wherein the game events comprise at least one of: a change in direction of travel; an acceleration; a deceleration; or a collision with an object.

16. The method of claim 14, wherein the authored control data is identified based on a combination of the user inputs and the identified game events.

17. The method of claim 16, wherein the algorithmic control data is identified based on a combination of the user inputs and the identified game events.

18. The method of claim 17, wherein the model comprises a physics based model.

19. The method of claim 18, wherein the authored control data indicates an exaggerated motion as compared to a motion indicated by the algorithmic control data.

20. The method of claim 18, wherein the authored control data indicates an diminished motion as compared to a motion indicated by the algorithmic control data.

21. The method of claim 18, wherein generating the hybrid control signal comprises retrieving weighting data, wherein the weighting data characterizes a relative importance of each of the authored control data and the algorithmic control data in generating the hybrid control signal; and combining the authored control data and the algorithmic control data according to the weighting data.

22. The method of claim 21, further comprising applying a safety modification to the control signals, wherein the safety modification changes the control signals according to a safety envelope limiting motions of the actuator system.

23. A method of applying dynamic movement constraints on a virtual experience, the method comprising:
providing content to at least one passenger of a simulation vehicle;
receiving user inputs via a plurality of controls of the simulation vehicle;
determining a user skill level based on the received user inputs;
determining progress through the virtual experience;
generating first movement constraints based on a combination of user skill level and progress through the virtual experience; and
applying the first movement constraints to the simulation vehicle to affect a level of at least one degree of freedom of the simulation vehicle; and determining a constraint collision, wherein the constraint collision comprises a indicated movement of a virtual conveyance beyond at least one of the first movement constraints.

24. The method of claim 23, wherein the first movement constraints comprise static constraints.

25. The method of claim 23, wherein the first movement constraints comprise dynamic constraints, wherein the dynamic constraints vary during the virtual experience as the user skill level varies.

26. The method of claim 23, wherein applying the first movement constraints to the simulation vehicle comprises applying the first movement constraints to a portion of the virtual experience.

27. The method of claim 23, wherein the constraint collision is triggered by a received user input.

28. The method of claim 27, further comprising modifying motion of the virtual conveyance based on the first movement constraint.

29. The method of claim 28, wherein modifying motion of the virtual conveyance comprises redirecting the virtual conveyance away from the first movement constraint.

30. The method of claim 28, wherein modifying motion of the virtual conveyance comprises providing tactile feedback to the passenger via the controls of the modified motion of the virtual conveyance.

31. The method of claim 28, further comprising providing the modified motion of the virtual conveyance to the passenger.

32. The method of claim 28, further comprising generating a second movement constraint for a second portion of the virtual experience.

33. The method of claim 32, wherein the second movement constraint is associated with a level of freedom of movement that is less than a level of freedom of movement associated with the first movement constraint.

* * * * *